INVENTOR.
JOHN A. FELTS
BY [signature]
ATTORNEY

March 9, 1965 J. A. FELTS 3,173,135

DISC-TYPE ADJUSTABLE CIRCULATING REGISTER FOR BINARY SIGNALS

Filed July 23, 1962 2 Sheets-Sheet 2

3,173,135

DISC-TYPE ADJUSTABLE CIRCULATING REGISTER FOR BINARY SIGNALS

John A. Felts, Los Angeles, Calif., assignor to General Precision, Inc., a corporation of Delaware
Filed July 23, 1962, Ser. No. 211,591
3 Claims. (Cl. 340—174.1)

The present invention relates to binary signal storage registers for use in digital computers, data processors, and the like; and it relates more particularly to an improved register in which binary signals are stored by recirculation around a closed loop.

Storage registers are in general use in digital computers, and the like, for providing temporary storage for information circulated through the computer. It is useful, for example, to provide an instruction register in the digital computer for temporarily storing each instruction in the computer program as the particular instruction is read out of the main computer memory for execution.

It is also usual to include further registers in the arithmetic section of the computer for providing temporary storage of the signals corresponding to the various operands while the specified arithmetic operations are being performed thereon.

Registers are also used in digital computers, and the like, to serve as a temporary storage for input and output signals.

It can be seen, therefore, that binary signal storage registers form an important part of the present-day digital computer, and of similar equipment.

These binary storage registers for the most part are of two general types. A first type is commonly known as a "static" register, and it is composed, for example, of a plurality of bistable circuits, known as flip-flops. The flip-flops are interconnected so that binary signals can be introduced to the static register formed by the flip-flops, and stored therein until needed. The different states of the flip-flops in the static register represent the different binary signals stored therein which, in turn, usually correspond to a multi-digit binary number. Since there is no circulation of the signals in this type of register, it is usually referred to as a static register.

The present invention is concerned with the second type of register in which the stored signals are circulated in a serial manner through a closed loop. This latter type of register may include a channel on the main memory of the computer, when the computer memory is of the movable type, such as a rotating magnetic drum or rotating magnetic disc. In such a case, the information circulated in the register is written serially into the selected channel of the memory by an appropriate write electro-magnetic transducer head and associated circuitry, and the information is serially read out of the channel a predetermined time interval later by an appropriate read electro-magnetic transducer head and associated circuitry. The information is circulated back from the read head circuitry to the write head circuitry through circuitry forming a closed loop, so that the information may be re-circulated in the register until needed.

In the use of re-circulating registers, the timing of the circulating information must be precisely maintained. In some instances, for example, the information must circulate and recirculate in the register without losing its original timing with respect to the bit times of the computer, as designated by the bit timing counter of the computer. In other instances, the information circulating in the register must execute precise shifts either to the left or to the right with respect to its original bit timing. In all cases, the interval between the writing of the information into the memory channel by the write head and its subsequent reading by the read head must be accurately and precisely maintained to correspond exactly to a predetermined number of bit times.

In the prior art computer using the rotating drum-type of memory, extreme difficulty has been encountered in providing for the mechanical mountings and adjustment mechanisms for the read and write heads included in the re-circulating registers. These heads in accordance with the prior art practice must be mounted with painstaking accuracy, and provisions must be made for delicate and precise adjustments so as to permit the spacing between the read and write heads to be set to a minute standard. This setting is to provide for exactly the proper spacing between the read and write heads so that the information circulated through the register may be written into the prior art rotating drum memory and subsequently read out of the prior art rotating drum memory without any change in its bit timing.

The improved circulating register of the present invention in the embodiment to be described includes, as one of its operating components, a disc-type of memory. The disc memory of the combination includes a rotatable magnetic memory disc, and the information is stored in a serial manner by magnetic recordings in each of a plurality of adjacent concentric circular channels on the disc.

The improved circulating register of the invention, in the embodiment to be described, also includes read and write transducer heads fixedly mounted in a block. The block is supported, in a manner to be described, so that the heads are in operative magnetically-coupled relationship with the disc-type memory. The write transducer head is then able to respond to applied electrical signals to record corresponding magnetic signals in a particular circular channel on the memory, and the read transducer head is able to respond to the magnetic signals in the particular channel on the memory disc to reproduce the original electrical signals. Appropriate circuitry is provided for inter-coupling the read and write heads to enable the information to circulate through the register.

In accordance with the embodiment of the invention to be described, the read and write heads referred to in the preceding paragraph are mounted in the block to have a fixed, non-adjustable spacing with respect to one another. This spacing is carefully established to approximate as closely as possible a desired predetermined number of bit times for the information which is to be circulated through the register.

Further in accordance with the embodiment of the invention to be described, adjustable means is provided for adjustably moving the above-mentioned block as a unit in a radial direction with respect to the magnetic disc-type memory, either towards or away from the axis of rotation of the disc. This radial adjustment provides a simple and convenient means for adjustably increasing or decreasing the bit times for the circulated information. An advantage of this type of adjustment is its lack of criticality in that a relatively large radial shift provides an extremely small timing change.

It is, accordingly, an object of the present invention to provide an improved binary signal storage register of the circulating type which may be constructed relatively simply and economically so as to provide a precise and accurate circulation time for the register.

Another object is to provide such an improved register which may incorporate relatively simple and inexpensive control means for adjusting the circulation time of the register to a precise value.

Other objects and advantages of the invention will become apparent upon a consideration of the following specification when taken in conjunction with the accompanying drawings, in which.

Figure 1:
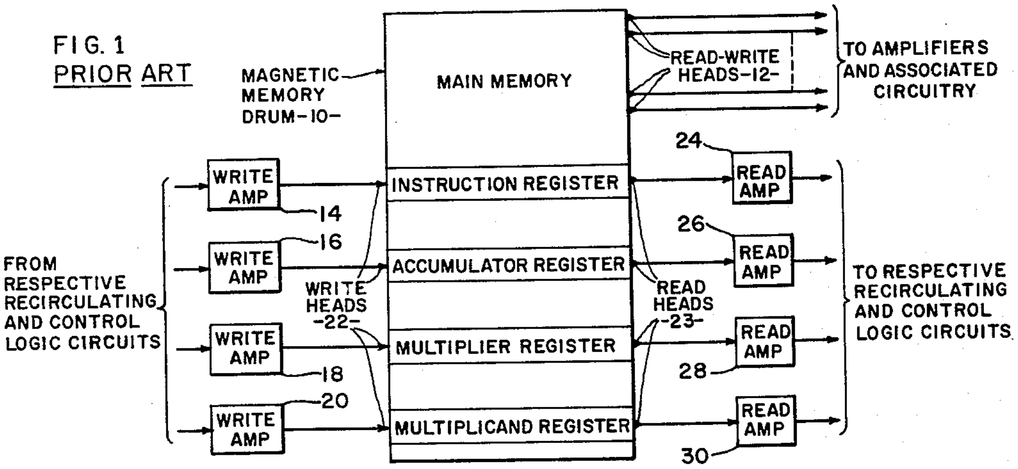
FIG. 1 PRIOR ART
FIGURE 1 is a schematic representation of a typical prior art magnetic memory drum system for use in a prior art type of computer, and this representation is included to indicate the usual manner in which portions of the memory of the computer are used as channels for the circulation registers of the computer.

The prior art system of FIGURE 1 is shown merely for the convenience in describing the functional aspects of the equipment in which the present invention may be utilized. The system includes a prior art type of magnetic memory drum 10. This prior art magnetic memory drum, in accordance with the usual prior art practice has its outer peripheral surface coated with an appropriate magnetic material, so as to enable the drum to receive and store magnetic signals representative of binary information. The major portion of the magnetic memory drum 10 forms the "main memory" of the computer, and a plurality of read-write electro-magnetic transducer heads, indicated generally as 12 are magnetically coupled to different annular channels on the main memory to read and record information in the different channels. Also, and in accordance with usual practice, these read-write heads 12 are connected to appropriate amplifiers and associated circuitry in the computer.

As mentioned above, it is usual for digital computers to include a plurality of registers for the temporary storage of information in the computer. These registers include, for example, an instruction register, an accumulator register, a multiplier register and a multiplicand register, and others. As also mentioned above, these registers may be of the circulating type, in which channels on the magnetic memory drum 10 may be used. In that case, information which is to be temporarily stored in each of the particular registers is circulated onto a corresponding channel on the drum, and the information is read a predetermined time later from the respective channel.

As indicated in FIGURE 1, the different registers include corresponding channels on the magnetic memory drum 10. A plurality of write amplifiers 14, 16, 18 and 20 are provided, for example, and these write amplifiers are coupled to corresponding write transducer heads, indicated generally as 22. The write heads are, in turn, magnetically coupled to the different annular register channels on the magnetic memory drum 10, and they respond to electrical signals from the write amplifiers to record corresponding magnetic signals in the different register channels. A corresponding plurality of read heads 23 are positioned in magnetically coupled relationship with the respective register channels, and these read heads are connected to different read amplifiers 24, 26, 28 and 30. The read amplifiers are coupled to respective re-circulating and control logic circuits which, in turn, are coupled back to the respective write amplifiers 14, 16, 18 and 20 to form the necessary re-circulation loops for the different registers.

By means of control and logic circuitry, well known to the art, information may be introduced to any one of the registers referred to above, and may be circulated in these various registers until needed. As mentioned, a difficulty encountered in the construction of registers in the prior art type of computer, such as described above, is the fact that each of the write heads 22 must be carefully and precisely positioned with respect to its corresponding one of the read heads 23. Precise and minute adjustments must also be made so that the exact spacing between the particular read and write heads is achieved. It is evident that any deviation from the precisely required spacing will result in the gain or loss of one or more bit times, with corresponding errors in the computer.

The circulating register of the present invention is used in conjunction with a disc-type of memory, in the embodiment to be described. The disc-type of memory is essentially similar to the drum memory of FIGURE 1. However, instead of being recorded on peripheral channels extending around the memory drum 10, the information is recorded in concentric circular channels extending around the magnetic memory disc.

Figure 2:
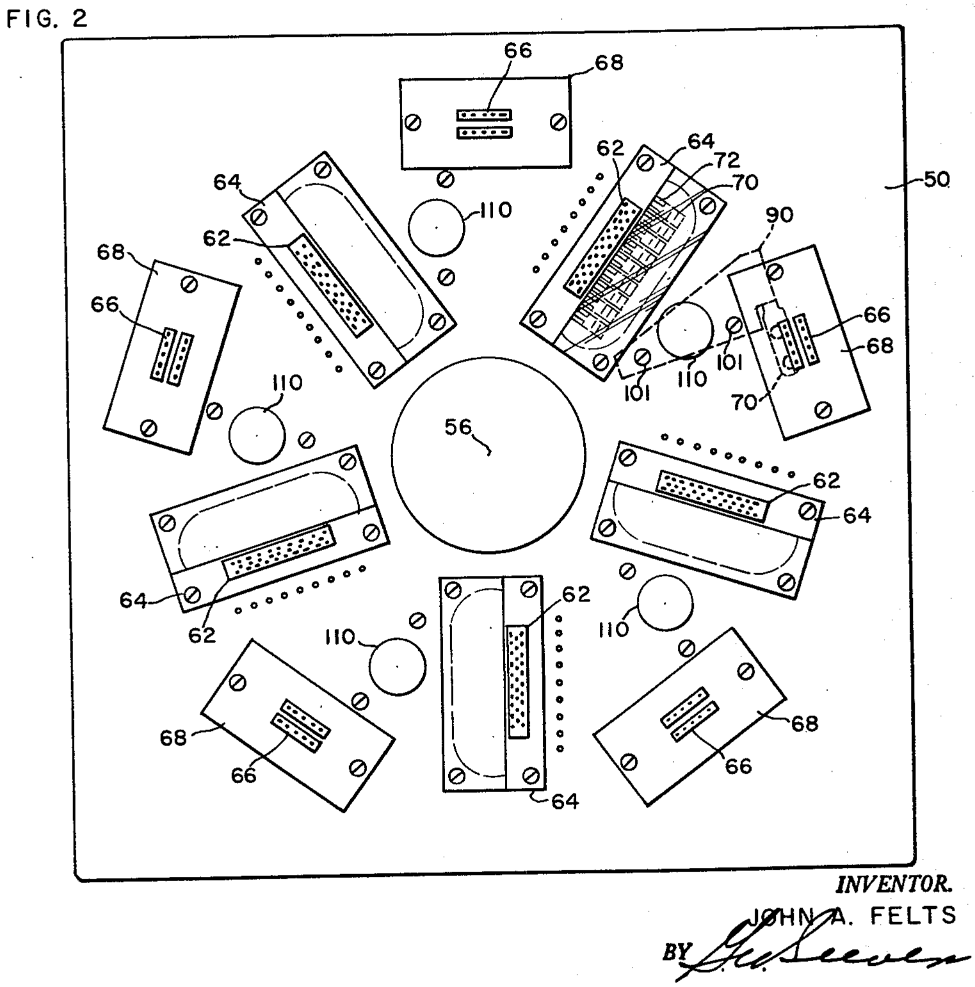
FIGURE 2 is a top plan view of the memory portion of a digital computer, including a magnetic disc-type of memory and mounting frame therefor, together with circulating register read and write transducer heads mounted in accordance with the concepts of the present invention.
Figure 3:
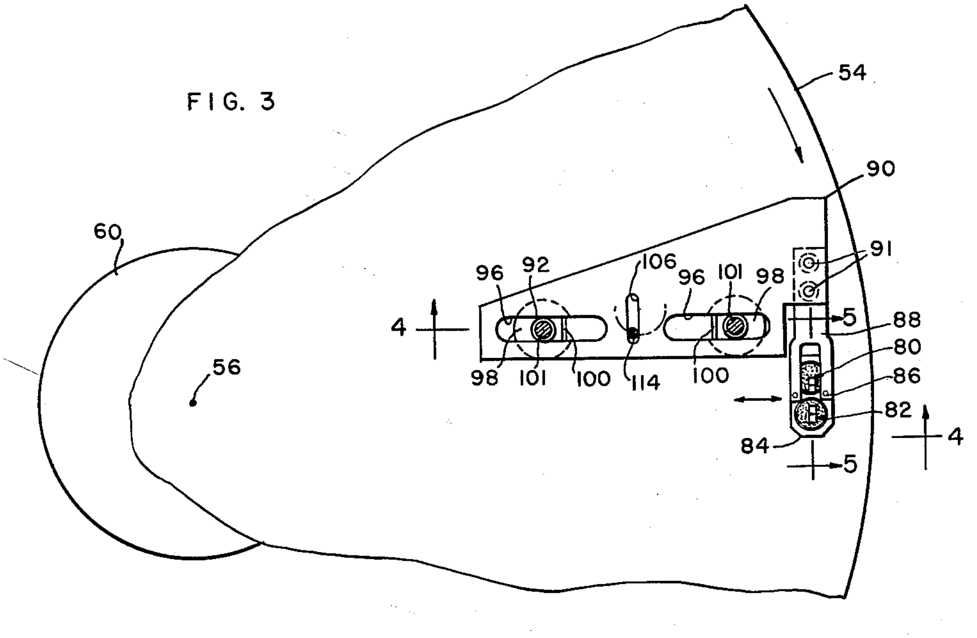
FIGURE 3 is a fragmentary top plan view of the magnetic disc memory, with the top frame removed to reveal the manner in which the circulating register read and write heads are mounted in a unitary block which, in turn, is supported in accordance with the invention.
Figures 4, 5:
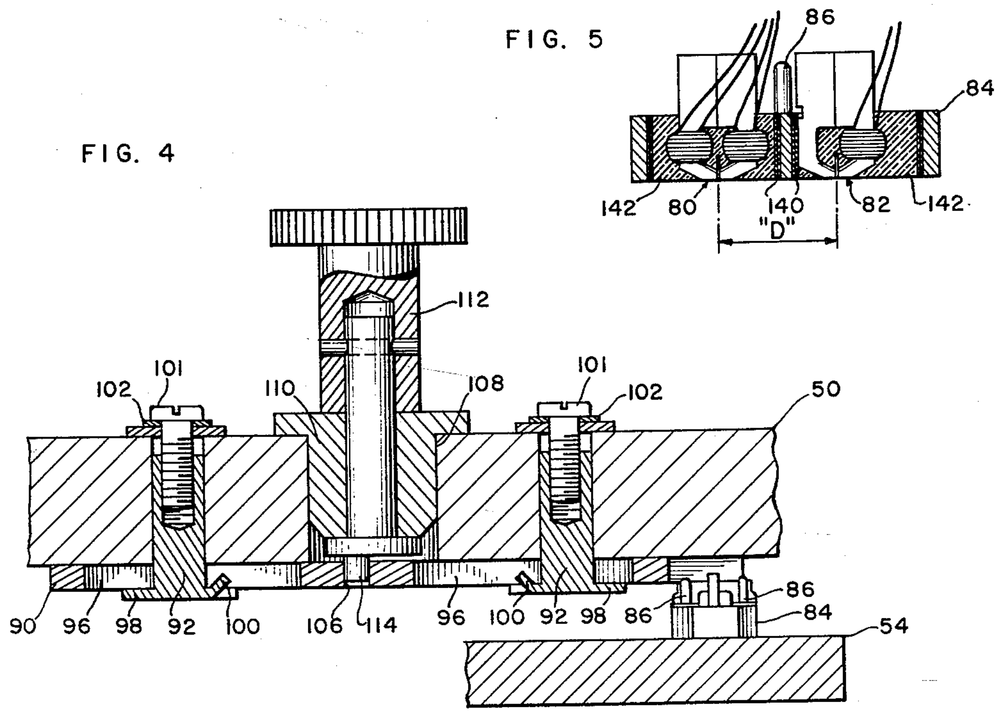
FIGURE 4 is a side sectional view of the assembly, taken substantially on the ine 4—4 of FIGURE 3.
FIGURE 5 is a side sectional view of the unitary block which supports the read and write circulating register heads in accordance with the concepts of the invention.

As illustrated in FIGURE 2, the magnetic memory disc may be mouned on a suitable frame 50. The frame serves to support the disc memory of FIGURE 2 in the chassis of the computer in which it is to be incorporated. The assembly of FIGURE 2 includes a rotatable magnetic memory disc 54 which is hidden in FIGURE 2, but which is shown in FIGURES 3 and 4. The magnetic memory disc 54 rotates about a central axis of rotation 56 which extends perpendicular to the plane of the frame 50. The magnetic memory disc 54 is driven about the central axis 56 by a suitable electrical motor 60 (FIGURE 3).

The magnetic memory disc 54, like the magnetic drum 10 of FIGURE 1, includes channels which are devoted, for example, to the storage of the main memory information. A plurality of read-write transducer heads 70 (FIGURE 2) are associated with different ones of the channels of the main memory. These heads may be supported in resilient brackets 72 in a manner described and claimed in co-pending application, Serial No. 198,894, filed May 31, 1962. The leads from these read-write heads may be brought to appropriate terminal blocks 62 on the frame 50, the blocks being supported on the frame by appropriate mounting panels 64.

The assembly illustrated in FIGURE 2 also includes five re-circulating registers which may include read and write heads mounted in accordance with the concepts of the invention. The read and write heads associated with each of these re-circulating registers have terminal leads which are brought out to respective connecting blocks 66 which are supported on corresponding mounting panels 68 secured to the top frame 50. The mechanical configuration of the mounts for the heads associated with all the circulating registers may be the same, and only one of the mounts will be described in conjunction with FIGURES 3–5.

As shown in FIGURES 3 and 5, each circulation register includes an electro-magnetic transducer write head 80 and an electro-magnetic transducer read head 82 which are mounted in a block 84. The block 84 has a pair of upwardly extending pins 86. The pins 86 extend through corresponding apertures in the free end of an arm 88. The arm 88 is in the form of a resilient spring strip, and it is secured at its other end to a bracket 90 by appropriate screws 91. The resilient spring strip 88 enables the heads 80 and 82 to ride directly on the surface of the magnetic disc 54 for intimate and close magnetic coupling between the heads and the magnetic disc. The bracket 90 is mounted on the frame 50 by a pair of elongated internally threaded members 92 which extend through slots 96 in the bracket 90. The members 92 each have a head 98 which engages the under side of the bracket 90 on each side of the slot, and each head 98 has a projection 100 extending into the respective slots 96 to prevent rotation of the corresponding member 92.

A pair of set screws 101 extend through corresponding apertures in the top frame 50 into threaded relationship with the members 92. The set screws 101 are held in place by appropriate split anchor washers 102. The members 92 support the bracket 90 on the frame 50 in a manner to permit a shift of the bracket 90 reciprocally, as best shown in FIGURE 3, such that the block 84 may be moved along a radial path with respect to the central axis 56. This provides a desired adjustment for the block 84, and when the block has been set to its adjusted radial position, with respect to the magnetic disc 54, the set screws 101 may be tightened to hold the assembly rigidly in place.

The bracket 90 also includes a transverse slot 106 which is positioned between the slots 96. The frame 50 has an aperture 108 formed in axial alignment with the slot 106. The aperture 108 may normally be closed by a suitable plug 110 (FIGURE 2).

The hole 108 is intended to receive the end 110 of an adjustment tool 112 (FIGURE 4). This tool has an eccentric projection 114 which engages the transverse slot 106 in the bracket 90, when the tool 112 is inserted down through the aperture 108.

To adjust the setting of the block 84, the set screws 101 are loosened, and the tool 112 is inserted down into the aperture 108, so that its projection 114 extends into the slot 106. Then, by a simple rotation of the tool 112, the bracket 90 may be moved to its adjusted position, so that the block 84 is established at a desired position on the radial axis through the central axis 56 (FIGURE 3). When this desired position has been established, the set screws 101 are tightened, and the tool 112 may be removed, so that the plug 110 may be inserted over the hole 108.

It will be appreciated that the adjustment of the block 84 described above is such that the heads 80 and 82 are brought to an engagement with the magnetic disc 54 such that the precise timing between these two heads is established. It should be noted that the radial adjustment is not critical, in that an appreciable radial shift of the block 84 is required to provide a timing adjustment of the order of one or two binary bits. In this manner, adjustments can be made, for example, down to one-tenth of a bit in a simple and convenient manner.

As mentioned above, and as shown in detail in FIGURE 5, the write head 80 and read head 82 of the circulating register are mounted in the block 84 in a fixed relationship with respect to one another.

Unlike the prior art assemblies, there is no need to provide for painstaking or critical adjustments between these heads. Instead, the heads 80 and 82 are positioned with a degree of precision in the block 84. Then, the final timing adjustments are made by the aforesaid radial movements of the entire block 84 until the precise timing is achieved.

In the embodiment of FIGURE 5, the block 84 may be composed, for example, of aluminum to serve as an electrostatic shield. The block also serves, for example, as a magnetic shield in the establishment of eddy currents. The heads 80 and 82 are mounted in corresponding apertures in the block 84, and they are wrapped by a suitable flexible magnetic shielding material, such as Permalloy, this material being indicated as 140 in FIGURE 5.

The resulting assemblies are potted in their respective apertures by a suitable plastic potting compound 142. This compound may, for example, be a suitable epoxy resin. The heads ars so mounted, as mentioned above, to be established at a fixed distance "D" between one another. The shielding provided by the block 84, and by the Permalloy shield 140, prevents cross-talk between the heads, in that it permits reading and recording to be carried on at the same time without interference.

The invention provides, therefore, an improved circulating register assembly, in which the read and write heads associated with a disc-type circulating member are mounted in fixed relationship with one another, and in which means are provided for enabling a radial adjustment to be made to the heads in unison, so as to achieve the desired timing in the circulating register.

While a particular embodiment of the invention has been shown and described, it is evident that modifications may be made. The following claims are intended to cover all such modifications as fall within the scope of the invention.

What is claimed is:

1. A circulating register for storing binary signals including: a frame; a magnetic memory storage disc rotatably mounted on said frame for rotation about a central axis; an electro-magnetic transducer write head responsive to applied electrical signals for recording corresponding magnetic signals on a face of said memory disc; an electro-magnetic transducer read head responsive to magnetic signals stored on said face of said memory disc for producing corresponding electrical signals; circuitry coupled to said read head and to said write head for circulating signals from said read head to said write head representative of information being circulated through said register; a mounting block for said read and write heads for mounting said heads in predetermined fixed spaced relationship with respect to one another; bracket means slidably mounted on said frame for receiving said mounting block to permit said mounting block to be reciprocally and continuously movable in a radial direction with respect to said central axis, said bracket means serving to support said mounting block in position such that said read and write transducer heads are disposed in operatively coupled relationship with said face of said memory disc and are arcuately spaced with respect thereto a predetermined distance along an annular channel thereof; and a control mechanism coupled to said bracket means for adjustably and continuously moving said mounting block in a radial direction towards and away from said central axis, so as to provide a predetermined circulation time for the register.

2. In a circulating register for storing binary signals and which includes a frame and a magnetic memory storage disc rotatably mounted on said frame for rotation about a central axis, the combination of: an electro-magnetic transducer write head responsive to applied electrical signals for recording corresponding magnetic signals on a face of said memory disc; an electro-magnetic transducer read head responsive to magnetic signals stored on said face of said memory disc for producing corresponding electrical signals; circuitry coupled to said read head and to said write head for circulating signals from said read head to said write head representative of information being circulated through said register; a mounting block for said read and write heads for mounting said heads in predetermined fixed spaced relationship with respect to one another; bracket means slidably mounted on said frame for receiving said mounting block to permit said mounting block to be reciprocally and continuously movable in a radial direction with respect to said central axis, said bracket means serving to support said mounting block in position such that said read and write transducer heads are disposed in operatively coupled relationship with said face of said memory disc and are arcuately spaced with respect thereto a predetermined distance along an annular channel thereof; and a control mechanism coupled to said bracket means for adjustably and continuously moving said mounting block in a radial direction towards and away from said central axis so as to provide a predetermined circulation time for the register.

3. The combination defined in claim 2 in which said bracket means includes at least one slot extending therethrough, which includes a support member extending through said frame and through said slot so as to support said bracket means on said frame and yet permit the aforesaid continuous slidable reciprocal movement of said mounting block; and in which said bracket means includes a further slot extending transversely to said first mentioned slot, and in which said frame includes an aperture aligned with said second slot in said bracket means for receiving a tool having an eccentric protruding member adapted to extend into said second slot to move said bracket means upon rotation of the tool to provide the aforesaid continuous reciprocal radial movement of said mounting block.

References Cited by the Examiner

UNITED STATES PATENTS

| | | | |
|---|---|---|---|
| 2,922,231 | 1/60 | Witt et al. | 340—174.1 |
| 3,025,710 | 3/62 | Muffley | 340—174.1 |

OTHER REFERENCES

Mounting Drum Head Adjuster, A. B. Carroll, IBM Technical Disclosure Bulletin, vol 3, No. 10.

IRVING L. SRAGOW, *Primary Examiner.*